United States Patent [19]

Carullo

[11] 3,990,555

[45] Nov. 9, 1976

[54] UNITARY ASSEMBLY OF OVERRUNNING CLUTCH AND BEARING

[75] Inventor: Paul Anthony Carullo, Torrington, Conn.

[73] Assignee: The Torrington Company, Torrington, Conn.

[22] Filed: Mar. 25, 1975

[21] Appl. No.: 561,928

[52] U.S. Cl. .................................. 192/45; 192/44
[51] Int. Cl.² .................... F16D 15/00; F16D 41/06
[58] Field of Search ............. 192/44, 45; 188/82.84

[56] References Cited
UNITED STATES PATENTS

| | | | |
|---|---|---|---|
| 2,153,988 | 4/1939 | Padgett | 192/44 X |
| 2,172,653 | 9/1939 | Flogaus | 192/45 |
| 2,815,838 | 12/1957 | Dodge | 192/45 |
| 3,187,863 | 6/1965 | Giometti | 192/45 |
| 3,362,267 | 1/1968 | Rozmus | 192/44 X |

Primary Examiner—Allan D. Herrmann
Attorney, Agent, or Firm—Frank S. Troidl

[57] ABSTRACT

The overrunning clutch includes an integral clutch cage means and sleeve bearing means located in the space between a shaft and a housing. One or more clutch cages integral with one or more annular sleeve bearings may be located in the annular space.

The integral clutch cage and bearing serves the dual function of a clutch cage in an overrunning clutch and a bearing to keep the shaft centered in the bore of the clutch housing when the clutch is overrunning.

6 Claims, 8 Drawing Figures

UNITARY ASSEMBLY OF OVERRUNNING CLUTCH AND BEARING

This invention relates to overrunning clutches. More particularly, this invention is an integral clutch cage means and sleeve bearing means as one unit in a unitary assembly of overrunning clutch and bearing.

In many machine applications using overrunning roller clutches, a bearing is required at one or each end of the clutch to keep the inner race or shaft of the clutch radially centered in the outer race and to carry the radial load on the shaft when the clutch is in the overrunning condition. Normally, the bearings are roller bearings or ball bearings. An example is shown in U.S. Pat. No. 3,194,368 granted July 13, 1965, to C. F. Benson et al.

In current clutches and bearings, usually one cage is used for the clutch rolling members and a separate cage used for each of the rolling member bearings. This invention eliminates the bearing rolling members and the cages usually required with such members by providing a clutch cage which includes a sleeve bearing as an integral component. The clutch cage may be so dimensioned that it alone acts as the bearing or there may be one or more axial sleeve bearing extensions on the cage. The cage and bearing may be of molded plastic and the cage section may have integral springs or it may carry inserted springs. In some clutches no springs are required. The cage and bearing may also be made of sintered metal, sintered plastic, cast metal, cast plastic, or any other material which may properly be used.

My invention may be used with an inner race or shaft and a housing of greater inside diameter than the diameter of the shaft to provide an annular space between the two. One or more axial portions of the shaft and the housing provide bearing surfaces. Also, one or more sets of circumferential cammed surfaces are provided on either the housing or the shaft. The integral clutch cage means and sleeve bearing means is located in the annular space. This integral member includes the same number of clutch cage sections as the number of sets of cammed surfaces and the same number of bearing sleeve sections as the number of axial bearing surfaces provided on the shaft and in the housing. I may also provide two or more individual sets of integral clutch cage and bearing combinations which will act together.

The invention as well as its many advantages will be further understood by reference to the following detailed description and drawings in which.

In the various figures, like parts are referred to by like numbers.

Figure 1:
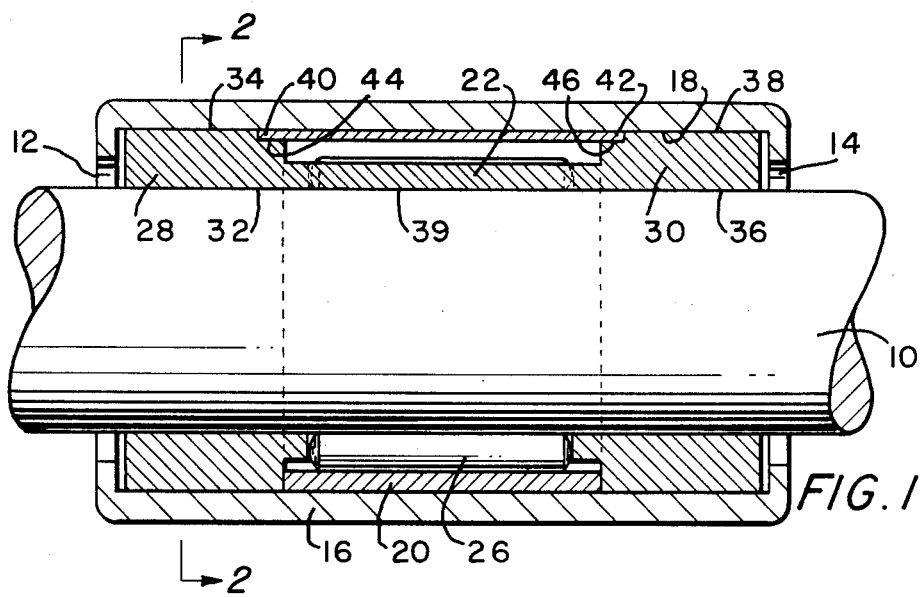
FIG. 1 is an elevational view, partly in section, taken along lines 1—1 of FIG. 3 showing one embodiment of my new integral clutch cage-bearing.
Figure 2:
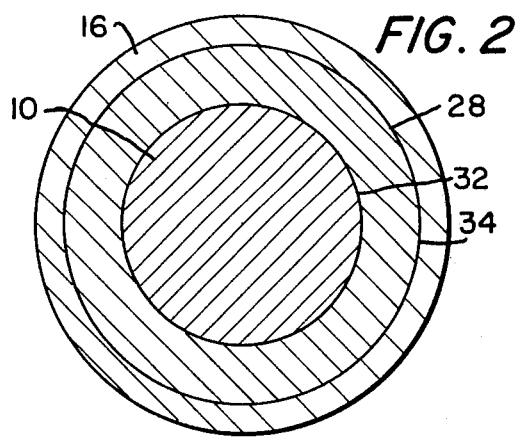
FIG. 2 is a sectional view taken generally along lines 2—2 of FIG. 1.

Referring to the figures, and more particularly to FIG. 1, a shaft 10 is shown extended through flange bores 12 and 14 of a housing 16. The bore 18 of the housing 16 has a larger diameter than the diameter of the shaft 10 to provide an annular space for my new integral clutch cage and bearing.

A set of circumferential cammed surfaces 20 (see FIGS. 1 and 3) are provided on the inside perimeter of the housing 16 and in the embodiment shown are axially, centrally located. In this embodiment, the cammed surfaces are on a separate insert in the housing 16, instead of being integral with the housing. If desired, the cammed surfaces may be placed on the shaft or inner race rather than on the inside perimeter of the housing. In some structures the cammed surfaces may extend the full length of the housing.

The clutch cage includes a plurality of circumferentially spaced axially extending cage bars 22. The spaced bars 22 provide roller pockets 24 (see FIG. 3). A roller 26 is provided in each roller pocket 24. In some clutches, there will be more than one roller per pocket. The inside diameter of the clutch cage is substantially equal to the diameter of the shaft 10. Therefore, the cage bars 22 are in contact with the shaft 10 and act as bearing surfaces in addition to a clutch cage. In some clutches, the clutch cage is also the only bearing without the additional length of other sleeve bearing sections. Alternatively, it is possible to have the cage bars positioned away from the shaft so that the sleeve bearing portions are the only bearings.

The integral clutch cage and bearing member includes a first annular sleeve 28 and a second annular sleeve 30 interconnected by the integral clutch cage including the spaced cage bars 22. The annular sleeves substantially fill the annular space between the shaft 10 and the housing 16. The outer or inner surfaces of the sleeves may be discontinuous and not fully cylindrical, if desired for lubrication or other purposes. Thus, the axial portion 32 and axial portion 34 of the shaft 10 and housing 16, respectively, provide bearing surfaces for annular sleeves 28 and axial portion 36 on the shaft 10 and axial portion 38 on housing 16 provides bearing surfaces for the substantially annular sleeve 30. As clearly seen in FIG. 1, the axial length of each sleeve is relatively long when compared to the axial length of pockets 24. The axial length of each sleeve is preferably at least one-half the axial length of pockets 24. The shaft portion 39 acts as a bearing surface for the cage bars 22 as well as a clutch surface for the rollers 26.

The cammed member 20 may include a pair of axially extending protrusions 40 and 42 which fit in notches 44 and 46, respectively, of the sleeve bearing portions 28 and 30 (see FIG. 1). This prevents relative rotation of the integral clutch cage and sleeve bearing with respect to the housing 16. Another method of preventing relative rotation of the cage-bearing and clutch housing is for the surface configuration of the bars to conform to the clutch cam surfaces sufficiently to prevent such undesirable relative motion.

Any number of clutch cages and sleeve bearings may be provided depending upon the use of the integral clutch cage and sleeve bearings. Also, to keep the overrunning clutch assembly as short as possible, the clutch cage itself may also be the bearing, using the cage bars and narrow end rims for this purpose.

Figure 3:
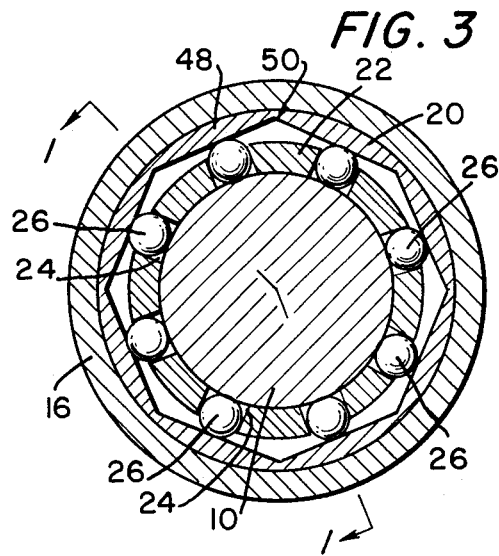
FIG. 3 is a sectional view showing the clutch section of the embodiment of FIG. 1 and FIG. 2.

As can be seen in FIG. 3, the diameter of the rollers 26 is greater than the space between the shaft 10 and cammed member 20 in the area 48 on the ramps of the cammed surfaces. The diameter of the rollers 26 is less than the space between the shaft 10 and the ramps of the cammed surfaces in the area 50 on the cammed surfaces. Thus, in operation, when the shaft 10 is rotated and the rollers move along the cammed surfaces, when the rollers reach the area 48 of the cammed surfaces, they become locked as shown in FIG. 3. Thereafter, the housing 16 will rotate with shaft 10. The overrunning clutch is unlocked by rotating the shaft 10 in the opposite direction to the housing, thus moving the rollers to the area 50 on the cammed surfaces. While in this position or overrunning condition, the bearing sleeves 28 and 30 keep the shaft 10 radially centered in the housing 16.

The clutch cage portion of FIG. 3 is shown without springs. In this structure, the cage must rotate slightly with the rollers toward the lock-up position, at which point it will be stationary with the housing. Alternatively, the cage may be absolutely fixed in relation to the housing, with springs on the cage to urge the rollers towards lockup.

If desired, the clutch ramps may be embossed directly on the interior of the housing rather than on a separate insert 20 in the housing. Also, in some cases, one or more finger-type clutch cages might be used with one or more bearing sections.

Figure 4:
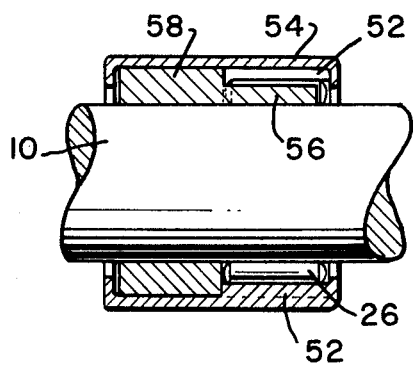
FIG. 4 is an elevational view, partly in section, showing another modification of my invention.

In FIG. 4, the circumferential cammed surface 52 is shown as being directly embossed on the interior of the housing 54. The clutch cage consists of a plurality of open ended cage bars 56 (one cage bar being shown in FIG. 4) which always keep the rollers substantially parallel. The finger-type cage is integrally connected to the sleeve bearing 58. The axial length of sleeve bearing 58 is at least equal to the axial length of the cage roller pockets.

Figure 6:
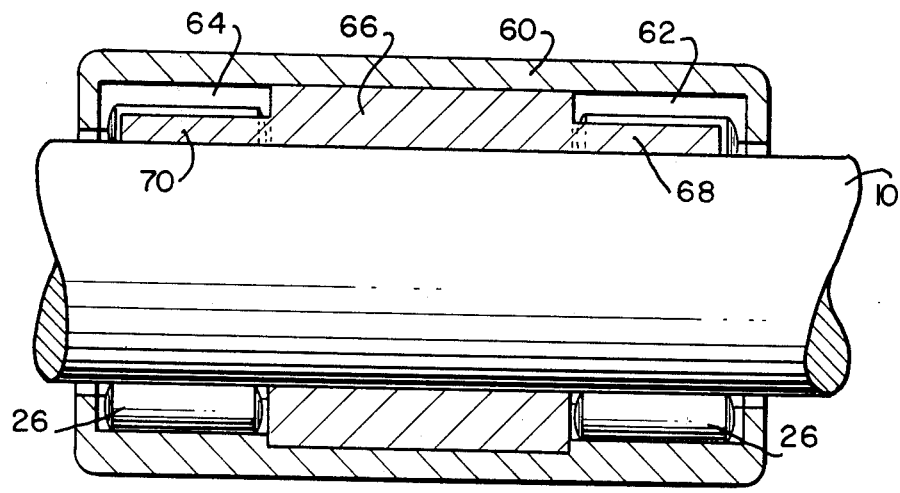
FIG. 6 is an elevational view, partly in section, showing still another modification of my invention.

We can also have two such finger-type clutch cages integral with the bearing between the two. Such a modification is illustrated in FIG. 6. In this figure, the housing 60 is provided with ramps 62 and 64 embossed on the inside interior of the housing 60 adjacent the extremities of the housing. An annular bearing 66 is provided in the space between the interior of the housing 60 and the shaft 10. Extending from each end of the annular bearing 66 are circumferentially spaced open-ended bars 68 and circumferentially spaced open-ended bars 70 (one of each being shown in FIG. 6).

In some structures, the clutch cage sections have rims on the axially outer ends of the bars with space allocated in the housing for these rims either axially inward from the housing flanges or radially inward from the housing flanges.

Figure 5:
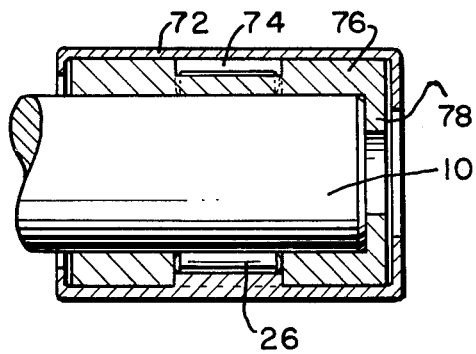
FIG. 5 is an elevational view, partly in section, showing still another modification of my invention.

The embodiments shown in FIG. 5 may be used on the end of the shaft 10. The housing 72 is provided with an embossed cammed surface 74. The combined integral cage bearing includes a substantially annular bearing 76 which is provided with an annular radial flange 78 which is adapted to fit over the end of the shaft 10. The flange 78 serves as a thrust bearing acting against the end of the shaft 10.

A thrust bearing projection, whether annular or not, may quite well bear against the shoulder of a stepped shaft instead of against the end of the shaft. If used with a stepped shaft, the integral clutch-bearing may be provided with interior diameters matched to the various diameters of the shaft. Such an arrangement is shown in the embodiment of FIG. 7.

Figure 7:
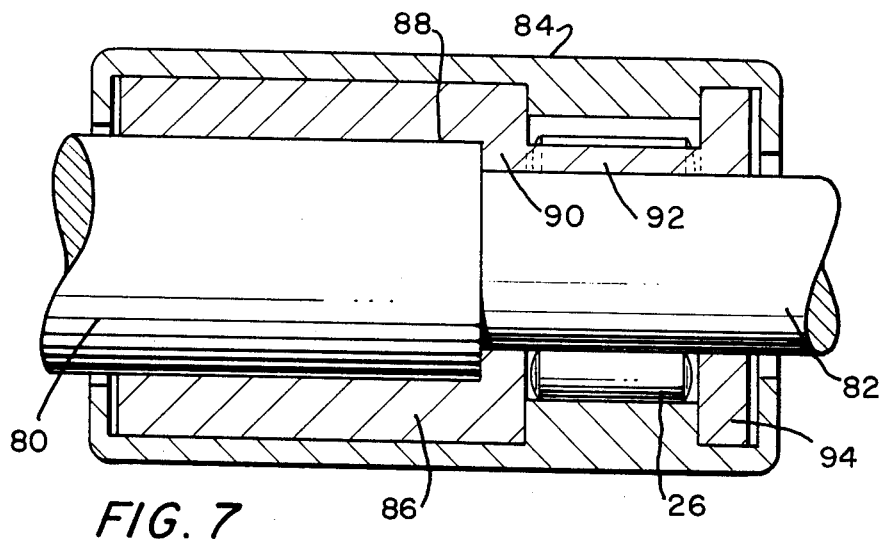
FIG. 7 is an elevational view, partly in section, showing still another modification of my invention.

Referring to FIG. 7, a shaft having a larger diameter portion 80 and a smaller diameter portion 82 is mounted for relative rotation within the housing 84. The bearing sleeve 86 is provided with an axial counter-bore 88 which provides an annular flange 90 against which the edge of the larger diameter portion 80 of the shaft fits. The inside diameter of the cage bars 92 (one being shown in FIG. 7) and the inside diameter of the bearing 94 match the outside diameter of the smaller diameter portion 82 of the shaft.

Figure 8:
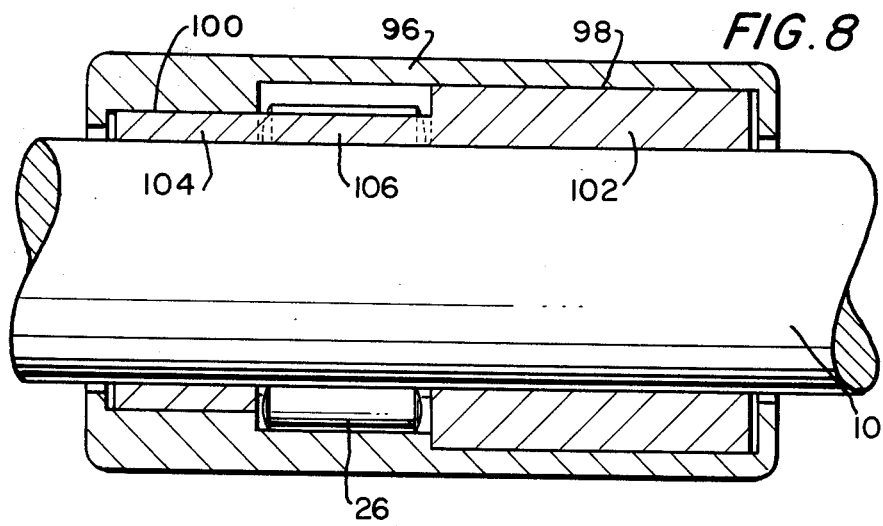
FIG. 8 is an elevational view, partly in section, showing still another modification of my invention.

My invention may also be used in housings having different inside diameters along its length. Such an arrangement is shown in the embodiment of FIG. 8. The housing 96 is provided with a first bore 98 of greater diameter than the bore 100. Thus, the inside periphery of the bore 98 is greater than the inside periphery of the bore 100. The integral clutch bearing includes a sleeve bearing 102 and a sleeve bearing 104 separated by the clutch cage including the cage bars 106 (one being shown in FIG. 8). The outside periphery of sleeve bearing 102 is greater than the outside periphery of sleeve bearing 104 and fit within the complementary inside peripheries 98 and 100, respectively, of the housing 96.

Two variations of the housing inner periphery may be applied to all structures. In the first modification, the clutch ramps extend axially along one or more bearing sections as well as along the clutch sections and may run full length of the housing. The exterior of the cage and bearing may be completely complementary to these cam surfaces or, if bearing loads are small, the bearing exterior may be cylindrical with contact only against the high points of the cam surfaces. In the second modification, each or selected ones of the clutch and bearing sections on the inside periphery of the housing may have diameters progressively stepped in size from the previous section to make it possible to press-form the housing interior shape with a single mandrel which can be withdrawn axially from the housing without damage. The exterior of the cage and bearing may be completely complementary to this housing stepped shape or it may only partially conform.

I claim:

1. In an overrunning clutch having an inner race, a housing with its inner surface radially spaced from the inner race to provide a space between the inner race and the housing; an axial portion of the inner race and an axial portion of the housing inner surface providing bearing surfaces, with one of said members having two sets of circumferential cammed surfaces adjacent said space, with the bearing surface of said one member separating the two sets of circumferential cammed surfaces, the improvement comprising: an integral clutch cage means and bearing means located in the space and including two cages axially separated by a sleeve; each cage containing a plurality of rolling members adapted to engage the cammed surfaces when the inner race and housing are in the locked position; and said sleeve being adapted to keep the inner race centered in the bore.

2. In an overrunning clutch having a shaft, a housing with its inner surface radially spaced from the shaft to provide a space between the shaft and the housing, at least one axial portion of the shaft and at least one axial portion of the housing inner surface providing bearing surfaces, with one of said members having at least one set of circumferential cammed surfaces adjacent said space, the improvement comprising: an integral clutch cage means and bearing means located in the space; the cage means including at least one cage containing a plurality of rolling members adapted to engage the cammed surfaces when the shaft and housing are in the locked position; and said bearing means comprising a sleeve with a radial flange adapted to fit over the end of the shaft.

3. In an overrunning clutch having a stepped shaft, a housing with its inner surface radially spaced from the stepped shaft to provide a space between the stepped shaft and the housing, at least one axial portion of the stepped shaft and at least one axial portion of the housing inner surface providing bearing surfaces, with one of said members having at least one set of circumferential cammed surfaces adjacent said space, the improvement comprising: an integral clutch cage means and bearing means located in the space; the cage means including at least one cage containing a plurality of rolling members adapted to engage the cammed surfaces when the stepped shaft and housing are in the locked position; and said bearing means comprising a sleeve with an axial counterbore in which a larger diameter of the stepped shaft fits.

4. In an overrunning clutch having an inner race, a housing with its inner surface radially spaced from the inner race to provide a space between the inner race and the housing, axial portions of the inner race and axial portions of the housing inner surface providing bearing surfaces, with one of said members having at least one set of circumferential cammed surfaces adjacent said space, the improvement comprising: an integral clutch cage means and bearing means located in the space and comprising a cage containing a plurality of rolling members adapted to engage the cammed surfaces when the inner race and housing are in the locked position, the bearing means including two sleeve bearings axially separated by the cage; the outside periphery of one sleeve bearing greater than the outside periphery of the other sleeve bearing; and the housing is provided with complementary inside peripheries.

5. In an overrunning clutch having an inner race, a housing with its inner surface radially spaced from the inner race to provide a space between the inner race and the housing, an axial portion of the inner race and an axial portion of the housing inner surface providing bearing surfaces, with one of said members having a set of circumferential cammed surfaces adjacent said space, the improvement comprising: an integral clutch cage means and bearing means located in the space; the cage means being a finger cage with open ended cage bars to form pockets, each containing at least one rolling member adapted to engage the cammed surfaces when the inner race and housing are in the locked position, the cage bars being shaped to always keep the rollers substantially parallel; and said bearing means including a sleeve adapted to keep the inner race centered in the bore; the axial length of the sleeve being at least equal to the axial length of the cage roller pockets.

6. A device in accordance with claim 5 wherein the inside diameters of the fingers are substantially equal to the diameter of the inner race whereby the fingers act as bearing surfaces.

* * * * *